(12) United States Patent
Yan et al.

(10) Patent No.: US 11,108,483 B1
(45) Date of Patent: Aug. 31, 2021

(54) MULTIFUNCTION EMERGENCY WEATHER RADIO

(71) Applicant: DongGuan JinWenHua Digital Technology Co., Ltd., Dongguan (CN)

(72) Inventors: Wen Yan, Xinyu (CN); Zhongmeng Zhang, Dazhou (CN)

(73) Assignee: DONGGUAN JINWENHUA DIGITAL TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/207,697

(22) Filed: Mar. 21, 2021

(30) Foreign Application Priority Data

Feb. 26, 2021 (CN) .......................... 202110218360.9

(51) Int. Cl.
*H04H 60/71* (2008.01)
*G08B 27/00* (2006.01)
*G08B 7/06* (2006.01)

(52) U.S. Cl.
CPC ............... *H04H 60/71* (2013.01); *G08B 7/06* (2013.01); *G08B 27/008* (2013.01)

(58) Field of Classification Search
CPC ......... H04H 60/71; G08B 27/008; G08B 7/06
See application file for complete search history.

(56) References Cited

U.S. PATENT DOCUMENTS

| | | | | |
|---|---|---|---|---|
| 6,121,885 A | * | 9/2000 | Masone | G08B 21/10 340/628 |
| 6,177,873 B1 | * | 1/2001 | Cragun | G01W 1/00 340/601 |
| 7,522,063 B2 | * | 4/2009 | Ehlers | G08B 7/06 340/286.01 |

OTHER PUBLICATIONS

International Search Report and Writen Opinion of PCT/GB2019/052642 dated Jan. 17, 2020.

* cited by examiner

*Primary Examiner* — Ankur Jain
(74) *Attorney, Agent, or Firm* — Justin Lampel

(57) ABSTRACT

The present disclosure provides a multifunction emergency weather radio, which relates to the field of emergency devices. The multifunction emergency weather radio includes a housing. A rear face of the housing is provided with a crank, the crank is of a three-segment design and includes a crank grip, a crank lever, and a rotary disk respectively. Two ends of the crank lever are respectively connected to the crank grip and the rotary disk. An interior of the housing is provided with a coil and a magnet at a position of the rotary disk. The rear face of the housing is provided with an accommodating groove corresponding to the crank. An upper end of the housing is provided with a rotary plate, and a side of the rotary plate is rotatably connected to the housing.

8 Claims, 5 Drawing Sheets

MULTIFUNCTION EMERGENCY WEATHER RADIO

CROSS-REFERENCE TO RELATED APPLICATIONS

The present application claims priority to Chinese Patent Application No. 202110218360.9, filed on Feb. 26, 2021, the content of which is incorporated herein by reference in its entirety.

TECHNICAL FIELD

The present disclosure relates to the field of emergency devices, and more particularly, to a multifunction emergency weather radio.

BACKGROUND

Hundreds of disasters happen every year around the world, and no country can avoid these. Disasters can be very intense, long lasting, and cover a wide geographic area. Various disasters vary in intensity, duration and influence range. After the disaster, the communication system collapses, and the disaster-affected people cannot obtain information from the outside.

SUMMARY

(1) Technical Problems to be Solved

The present disclosure provides a multifunctional emergency weather radio. The radio is set to be powered by a hand cranking manner and photovoltaic to ensure normal use without an external power supply. At the same time, the radio is also equipped with functions of illumination lamp, reading lamp and SOS for help, making the radio multifunctional and more beneficial for calling for help after a disaster.

(2) Technical Solutions

In order to achieve the above objects, the present invention is realized through the following technical solutions. A multifunctional emergency weather radio includes a housing. A rear face of the housing is provided with a crank. The crank is of a three-segment design and includes a crank grip, a crank lever, and a rotary disk respectively. Two ends of the crank lever are respectively connected to the crank grip and the rotary disk. An interior of the housing is provided with a coil and a magnet at a position of the rotary disk. The rear face of the housing is provided with an accommodating groove corresponding to the crank.

An upper end of the housing is provided with a rotary plate, and a side of the rotary plate is rotatably connected to the housing. The rotary plate is provided with a photovoltaic panel and a lamp bead. A lower part of a front face of the housing is provided with a key.

A left side of the housing is provided with an illumination lamp, and the illumination lamp includes a lamp shade. An edge of the lamp shade is snap-fitted with the housing. An inner side of the lamp shade is provided with a high beam lamp and low beam lamps, and the low beam lamps are at an upper side and a lower side of the high beam lamp.

The front face of the housing is provided with knobs which are at one side of the key, and a number of the knobs is two. The front face of the housing is provided with a band-switching sliding key at one side of the knobs, and a middle part of the front face of the housing is provided with a band identifier above the band-switching sliding key.

Preferably, the housing includes a front shell and a rear shell, the rear shell is provided with a screw, and the rear shell and the front shell are fixedly connected by the screw.

Preferably, the interior of the housing is provided with a speaker in a vicinity of the illumination lamp, and a position of the front face of the housing corresponding to the speaker is provided with a protection net.

Preferably, a right end of the housing is provided with a sealing cover plate, the right end of the housing is provided with an output interface and an input interface, which are covered by the sealing cover plate, and the right end of the housing is provided with a tether ring above the sealing cover plate.

Preferably, the front face of the housing is provided with a power indication lamp close to the band identifier.

Preferably, the rear face of the housing is provided a second switch located at one side of the crank, and the second switch is a sliding type.

Preferably, the upper end of the housing is provided with a first switch close to the illumination lamp, and the first switch is a pressing type.

Preferably, an upper part of the rear face of the housing is provided with an antenna, and the antenna is a multi-section telescopic type.

The operation principle is as follows. In the use of the present invention, when charging is required, the sealing cover plate is moved, the input interface is used to charge the battery inside the housing. Alternatively, a rotary rod is rotated to move the crank out from the accommodating groove, the crank is rotated, and the magnet is driven simultaneously, causing the coil to cut the magnetic field lines to generate current, such that the battery is charged. The second switch is turned on, and the battery may be powered through the current generated by the irradiation of sunlight on the photovoltaic panel.

When it is used as a radio, the antenna is extended firstly, the radio is turned on through the knob, the volume of the speaker is adjusted, and the band-switching sliding key is provided for frequency band switching.

The illumination lamp can be turned on by pressing the second switch. The rotary plate is rotated such that the rotary plate is in a vertical state. The lamp bead on the back side of the rotary plate is energized, that is, the reading lamp is used.

By long pressing the key, the SOS function is enabled, that is, the speaker generates an alarm sound.

(3) Beneficial Effect

The present disclosure provides a multifunctional emergency weather radio, which has the following beneficial effect.

1, the present invention is a radio itself, and is equipped with hand cranking power generation and photovoltaic power generation. After a disaster, the radio can also generate power and acquire information from the outside. At the same time, the radio is also equipped with functions of the illumination lamp, reading lamp and SOS, which is beneficial for calling for help after a disaster.

2, in the present invention, a hand-operation power generation structure is provided, and its crank is placed in the accommodating groove. A tether ring is provided at the same time. The above two configuration are both convenient for carrying the device out.

The present disclosure provides a multifunction emergency weather radio, which relates to the field of emergency devices. The multifunction emergency weather radio includes a housing. A rear face of the housing is provided with a crank, the crank is of a three-segment design and includes a crank grip, a crank lever, and a rotary disk respectively. Two ends of the crank lever are respectively connected to the crank grip and the rotary disk. An interior of the housing is provided with a coil and a magnet at a position of the rotary disk. The rear face of the housing is provided with an accommodating groove corresponding to the crank. An upper end of the housing is provided with a rotary plate, and a side of the rotary plate is rotatably connected to the housing. A lower part of a front face of the housing is provided with a key. A left side of the housing is provided with an illumination lamp, the illumination lamp includes a lamp shade, and an edge of the lamp shade is snap-fitted with the housing. The front face of the housing is provided with knobs which are at one side of the key. In the present disclosure, the radio may be powered through a wired manner, a hand cranking manner and photovoltaic, and the radio also has the functions of a flashlight, reading lamp and SOS for help.

DESCRIPTION OF EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

Embodiments

Figure 1:
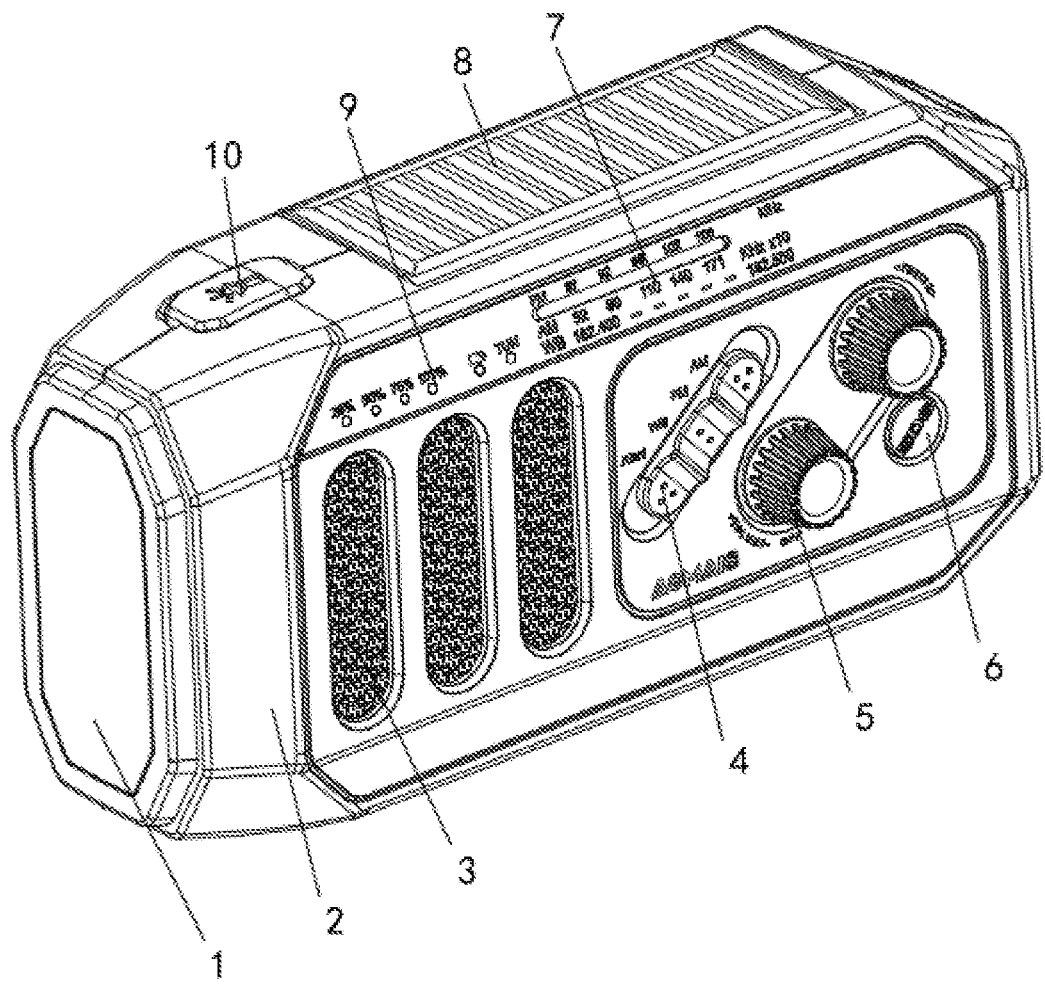
FIG. 1 is a schematic perspective view of a multifunction emergency weather radio of the present invention.
Figure 2:
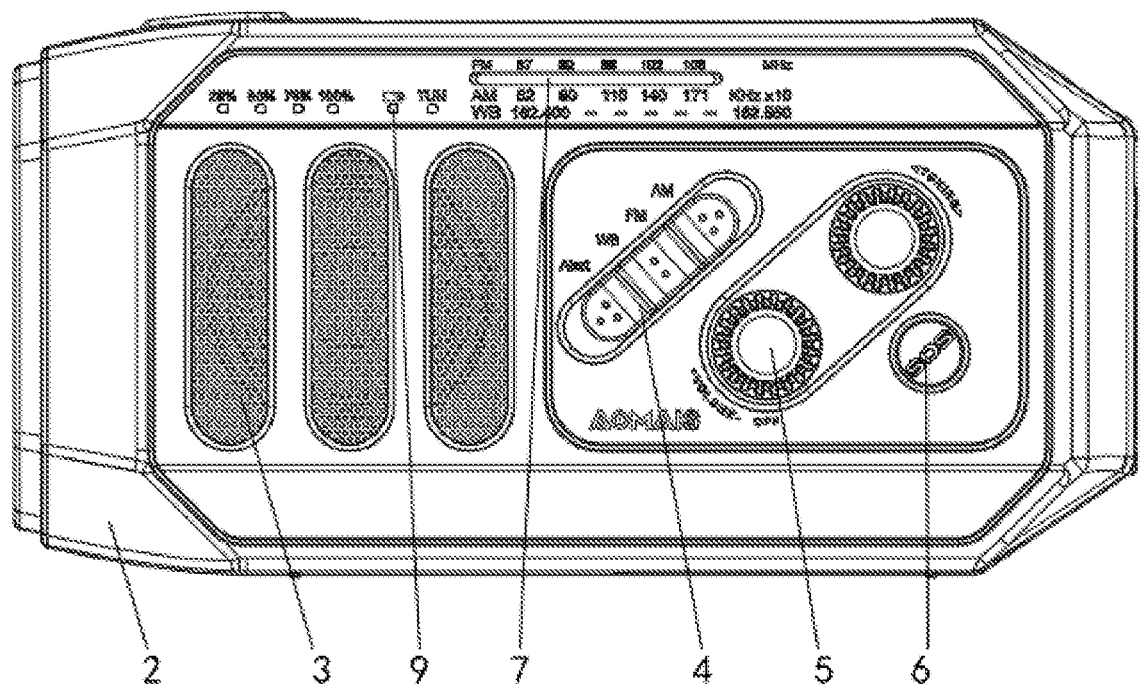
FIG. 2 is a front view of a multifunction emergency weather radio of the present invention.
Figure 3:
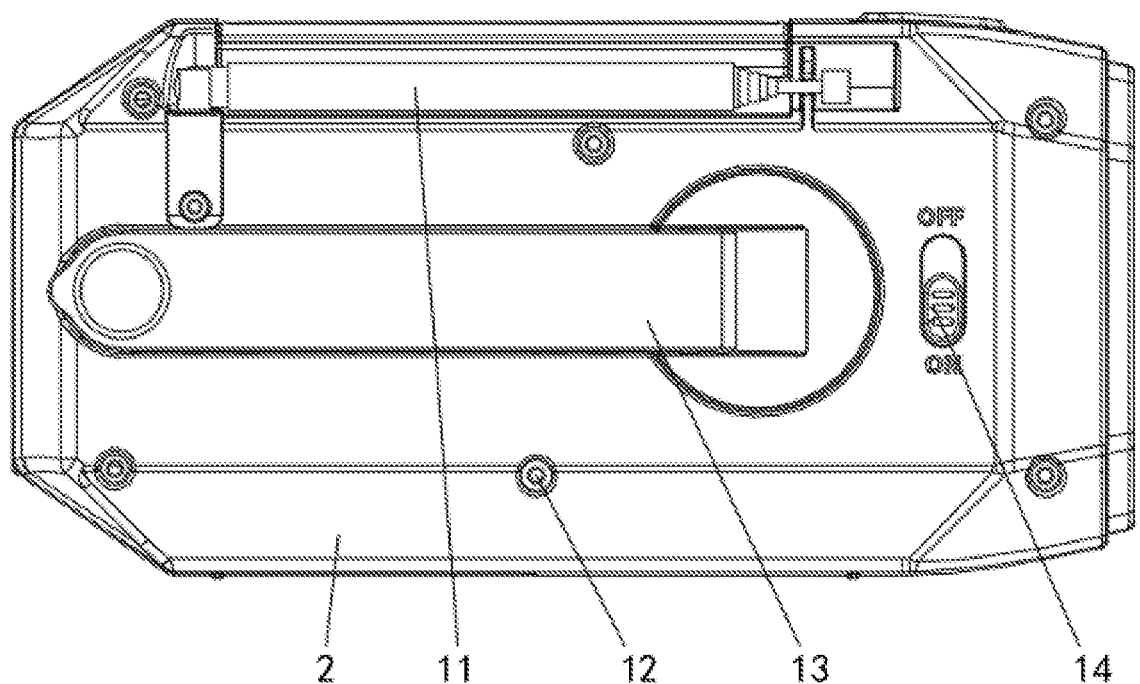
FIG. 3 is a rear view of a multifunction emergency weather radio of the present invention.
Figure 4:
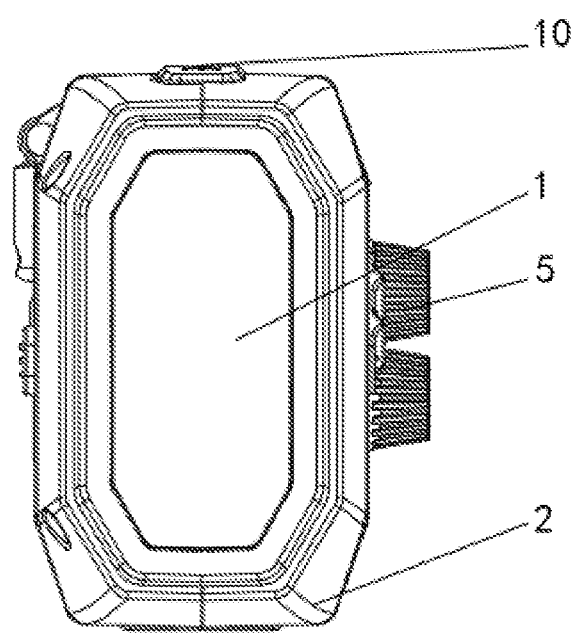
FIG. 4 is a left view of a multifunction emergency weather radio of the present invention.
Figure 5:
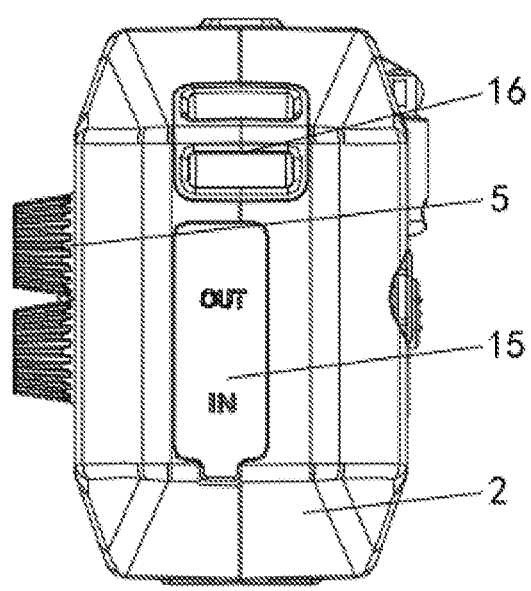
FIG. 5 is a right view of a multifunction emergency weather radio of the present invention.
Reference numeral list: 1 illumination lamp; 2 housing; 3 speaker; 4 band-switching sliding key; 5 knob; 6 key; 7 band identifier; 8 rotary plate; 9 power indication lamp; 10 first switch; 11 antenna; 12 screw; 13 crank; 14 second switch; 15 sealing cover plate; 16 tether ring.

As shown in FIG. 1 to FIG. 5, embodiments of the present invention provide a multifunction emergency weather radio. The multifunction emergency weather radio includes a housing 2. A rear face of the housing 2 is provided with a crank 13. The crank 13 is of a three-segment design and includes a crank grip, a crank lever, and a rotary disk respectively. Two ends of the crank lever are respectively connected to the crank grip and the rotary disk. An interior of the housing 2 is provided with a coil and a magnet at a position of the rotary disk. By cranking the crank 13, the coil or the magnet is driven to rotate, such that the coil cuts the magnetic field lines to generate current. Preferably, a mechanical transmission is between the rotation and the magnet, and the transmission is performed through a large gear and a small gear. The large gear is arranged on the rotary disk, and the small gear is arranged on the magnet, such that the coil can cuts the magnetic field lines quickly. The rear face of the housing 2 is provided with an accommodating groove corresponding to the crank 13. When the crank 13 is not in use, the crank 13 is folded into the accommodating groove, which improves the portability of the device and is convenient to use.

An upper end of the housing 2 is provided with a rotary plate 8, and a side of the rotary plate 8 is rotatably connected to the housing 2 such that the rotary plate 8 can be erected. The rotary plate 8 is provided with a photovoltaic panel and a lamp bead. The photovoltaic panel is arranged on a front face of the rotary plate 8, and the lamp bead is arranged on a rear face of the rotary plate 8. When the rotary plate 8 is erected, that is, a switch arranged at the rotation is turned on, the lamp bead is energized and works. When the rotary plate 8 is laid flat, the photovoltaic panel works, and if the rotary plate 8 is irradiated by light, the photovoltaic panel generates electricity. A lower part of a front face of the housing 2 is provided with a key 6, and the function of the key 6 is sending an SOS signal. When the key 6 is long pressed for more than three seconds, for avoiding accidental touch, a speaker 3 that is controlled by a MCU arranged inside the housing 2 generates a distress alarm. By actual measurement, the alarm sound reached 105 decibels.

A left side of the housing 2 is provided with an illumination lamp 1, and the illumination lamp 1 includes a lamp shade. An edge of the lamp shade is snap-fitted with the housing 2. An inner side of the lamp shade is provided with a high beam lamp and low beam lamps, and the low beam lamps are at an upper side and a lower side of the high beam lamp. Each of the upper-side low beam lamp and the lower-side low beam lamp is composed of 5 COB lamp beads. The high beam lamp is composed of 10000 LED lamp beads, and a condenser is provided outside of the lamp beads for achieving high beam illumination.

The front face of the housing 2 is provided with knobs 5 which are at one side of the key 6, and the number of the knobs 5 is two. The upper one of the knobs 5 is used for adjusting the frequency band of the radio, and the lower one of the knobs 5 is used for adjusting the volume of the speaker 3. The adjustment positions of the two knobs 5 are both frustums, and the sidewalls of the frustums are provided with protective textures. The front face of the housing 2 is provided with a band-switching sliding key 4 on one side of the knobs 5, and a middle part of the front face of the housing 2 is provided with a band identifier 7 above the band-switching sliding key 4, which is a common structure in radios.

The housing 2 can be divided into a front shell and a rear shell, the rear shell is provided with a screw 12, and the rear shell and the front shell are fixedly connected by the screw 12.

The interior of the housing 2 is provided with a speaker 3 in a vicinity of the illumination lamp 1, and a position of the front face of the housing 2 corresponding to the speaker 3 is provided with a protection net. The front face of the housing 2 is provided with power indication lamps 9 close to the band identifier 7. There are 5 power indication lamps 9, one indication lamp is used for indicating the health of the battery, and the other four indication lamps are used for indicating the power amount of the battery. A right end of the housing 2 is provided with a sealing cover plate 15. The right end of the housing 2 is provided with an output interface and an input interface. The type of the output interface is USB Type A, the input interface is USB Type C, and other interface types are not limited. The input interface is used for charging the battery and is covered by the sealing cover plate 15. The sealing cover plate 15 protects the input interface and the output interface and improves the aesthetics of the device. The right end of the housing 2 is provided with a tether ring 16 above the sealing cover plate 15. A tether is tied to the tether ring 16, facilitating the carrying of the device.

The rear face of the housing 2 is provided a second switch 14 located at one side of the crank 13. The second switch 14 is a sliding type and is used for connecting the coil and the battery. When the crank 13 is not used, it needs to turn off the second switch 14. The upper end of the housing 2 is provided with a first switch 10 close to the illumination lamp 1, and the first switch 10 is a pressing type. By pressing the first switch 10, the turning-on and turning-off of the illumination lamp 1 can be controlled. By pressing continuously, different illumination modes can be activated, namely the high beam mode and the low beam mode. An upper part of the rear face of the housing 2 is provided with an antenna 11, and the antenna 11 is a multi-section telescopic type, which is a common structure in radios.

Although the embodiments of the present invention have been illustrated and described, those of ordinary skill in the art can understand that various changes, modifications, substitutions, and variations can be made to these embodiments without departing from the principle and spirit of the present invention. The scope of the present invention is defined by the appended claims and their equivalents.

What is claimed is:

1. A multifunction emergency weather radio, comprising:
    a housing, wherein a rear face of the housing is provided with a crank, the crank is of a three-segment design and comprises a crank grip, a crank lever, and a rotary disk respectively, two ends of the crank lever are respectively connected to the crank grip and the rotary disk, an interior of the housing is provided with a coil and a magnet at a position of the rotary disk, the rear face of the housing is provided with an accommodating groove corresponding to the crank;
    an upper end of the housing is provided with a rotary plate, a side of the rotary plate is rotatably connected to the housing, the rotary plate is provided with a photovoltaic panel and a lamp bead, a lower part of a front face of the housing is provided with a key;
    a left side of the housing is provided with an illumination lamp, the illumination lamp comprises a lamp shade, an edge of the lamp shade is snap-fitted with the housing, an inner side of the lamp shade is provided with a high beam lamp and low beam lamps, and the low beam lamps are at an upper side and a lower side of the high beam lamp;
    the front face of the housing is provided with knobs which are at one side of the key, a number of the knobs is two, the front face of the housing is provided with a band-switching sliding key at one side of the knobs, and a middle part of the front face of the housing is provided with a band identifier above the band-switching sliding key.

2. The multifunction emergency weather radio of claim 1, wherein the housing comprises a front shell and a rear shell, the rear shell is provided with a screw, and the rear shell and the front shell are fixedly connected by the screw.

3. The multifunction emergency weather radio of claim 1, wherein the interior of the housing is provided with a speaker in a vicinity of the illumination lamp, and a position of the front face of the housing corresponding to the speaker is provided with a protection net.

4. The multifunction emergency weather radio of claim 1, wherein a right end of the housing is provided with a sealing cover plate, the right end of the housing is provided with an output interface and an input interface, which are covered by the sealing cover plate, and the right end of the housing is provided with a tether ring above the sealing cover plate.

5. The multifunction emergency weather radio of claim 1, wherein the front face of the housing is provided with a power indication lamp close to the band identifier.

6. The multifunction emergency weather radio of claim 1, wherein the rear face of the housing is provided a second switch located at one side of the crank, and the second switch is a sliding type.

7. The multifunction emergency weather radio of claim 1, wherein the upper end of the housing is provided with a first switch close to the illumination lamp, and the first switch is a pressing type.

8. The multifunction emergency weather radio of claim 1, wherein an upper part of the rear face of the housing is provided with an antenna, and the antenna is a multi-section telescopic type.

* * * * *

(12) EX PARTE REEXAMINATION CERTIFICATE (12209th)
United States Patent
Yan et al.

(10) Number: US 11,108,483 C1
(45) Certificate Issued: Jan. 19, 2023

(54) MULTIFUNCTION EMERGENCY WEATHER RADIO

(71) Applicant: DongGuan JinWenHua Digital Technology Co., Ltd., Dongguan (CN)

(72) Inventors: Wen Yan, Xinyu (CN); Zhongmeng Zhang, Dazhou (CN)

(73) Assignee: DONGGUAN JINWENHUA DIGITAL TECHNOLOGY CO., LTD., Dongguan (CN)

Reexamination Request:
No. 90/015,023, Jun. 2, 2022

Reexamination Certificate for:
Patent No.: 11,108,483
Issued: Aug. 31, 2021
Appl. No.: 17/207,697
Filed: Mar. 21, 2021

(30) Foreign Application Priority Data

Feb. 26, 2021 (CN) .......................... 202110218360.9

(51) Int. Cl.
*H04H 60/71* (2008.01)
*G08B 7/06* (2006.01)
*G08B 27/00* (2006.01)

(52) U.S. Cl.
CPC ............... *H04H 60/71* (2013.01); *G08B 7/06* (2013.01); *G08B 27/008* (2013.01)

(58) Field of Classification Search
None
See application file for complete search history.

(56) References Cited

To view the complete listing of prior art documents cited during the proceeding for Reexamination Control Number 90/015,023, please refer to the USPTO's Patent Electronic System.

*Primary Examiner* — Ovidio Escalante

(57) ABSTRACT

The present disclosure provides a multifunction emergency weather radio, which relates to the field of emergency devices. The multifunction emergency weather radio includes a housing. A rear face of the housing is provided with a crank, the crank is of a three-segment design and includes a crank grip, a crank lever, and a rotary disk respectively. Two ends of the crank lever are respectively connected to the crank grip and the rotary disk. An interior of the housing is provided with a coil and a magnet at a position of the rotary disk. The rear face of the housing is provided with an accommodating groove corresponding to the crank. An upper end of the housing is provided with a rotary plate, and a side of the rotary plate is rotatably connected to the housing.

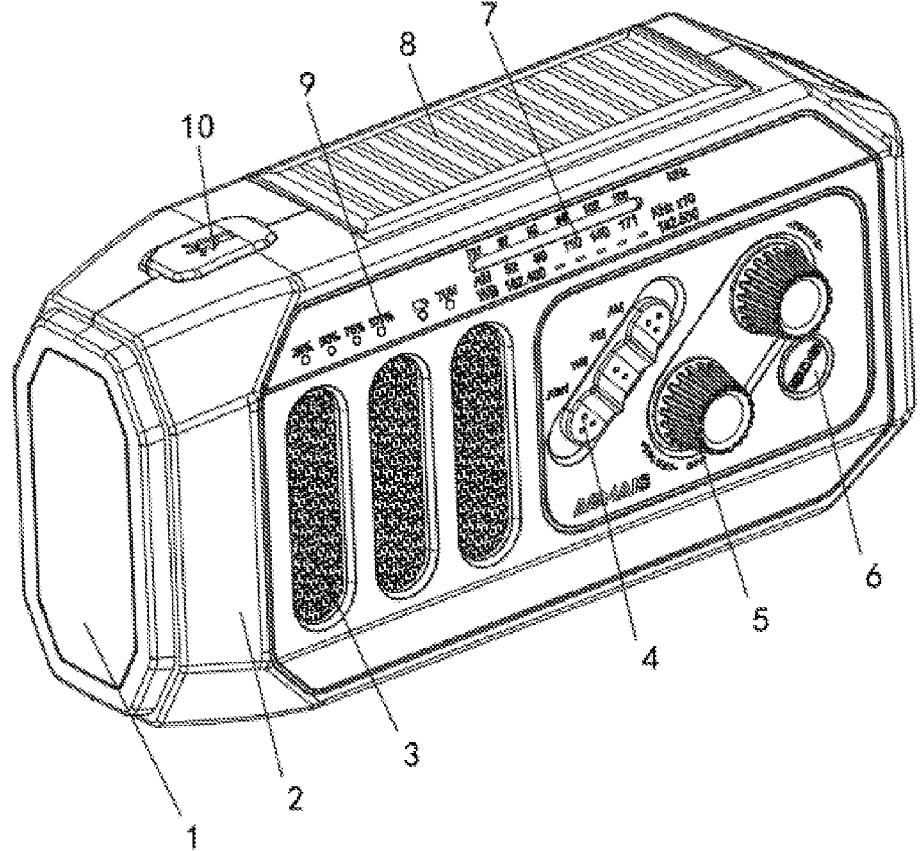

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-3 and 5-8 are cancelled.

Claim 4 was not reexamined.

\* \* \* \* \*